Sept. 10, 1935.     C. W. BURST     2,013,910

COLLAPSIBLE FRAME FOR BABY BUGGIES

Filed Nov. 12, 1934

Inventor
Carl W. Burst
by Rippey & Kingsland
His Attorneys

Patented Sept. 10, 1935

2,013,910

UNITED STATES PATENT OFFICE 2,013,910

COLLAPSIBLE FRAME FOR BABY BUGGIES

Carl W. Burst, St. Louis, Mo., assignor to Welsh Hartman Co., St. Louis, Mo., a corporation of Missouri Application November 12, 1934, Serial No. 752,554

7 Claims. (Cl. 280—41)

This invention relates to a frame for baby carriage of the type which may be folded when not in use.

An object of the invention is to provide a structure in which the rigidity is improved, which will not collapse accidentally, and which will have added strength.

Another object of the invention is to provide unitary means, operable by a foot either to collapse the frame or to latch it in extended position by a single movement without danger of injury to the operator.

Other and specific objects will be apparent from the following detail description, taken in connection with the accompanying drawing.

Figure 1:
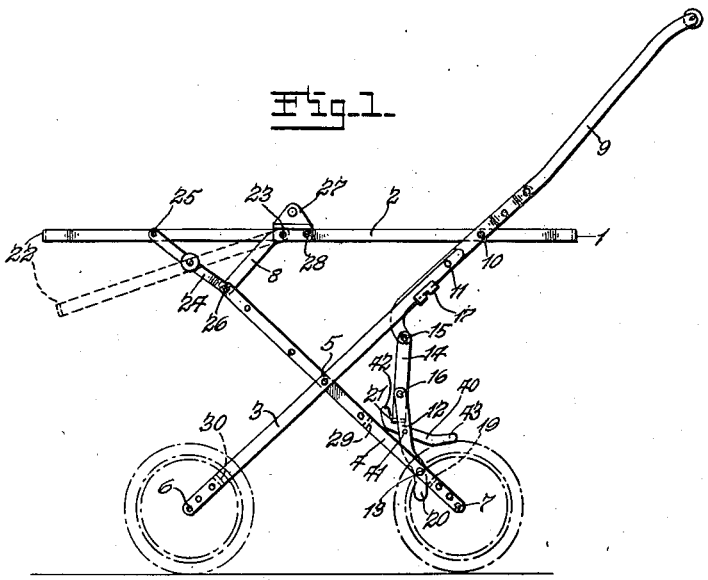
Fig. 1 is a side elevation with the frame in extended position.

The frame includes a body supporting member 1, which is in the form of a yoke, and which has, on each side of the frame, a side bar 2. A pair of scissor bars 3 and 4 (one pair on each side of the frame) are pivotally connected by a pin 5, the first bar 3 being supported by a front axle 6, and the second bar 4 being supported by a rear axle 7, and being pivotally connected at its upper end to the side bar 2, or more particularly to a downwardly extending integral part 8 of the bar 2. A handle bar 9 is pivotally connected at an intermediate point 10 to the rear of the bar 2 and at a lower point 11 is pivoted to the upper end of the first scissor bar 3 forming a knee.

A toggle to straighten the knee is provided on each side of the frame and comprises a link 12 pivoted at 13 to the second scissor bar 4 and a link 14 pivoted at 15 to one of the knee members, which as specifically shown is an extension integral with the handle bar 9. The links 12 and 14 of the toggle are connected by the pivotal pin 16.

A clip or strip 17 is held by a rivet 18 to the handle bar 9 and forms an abutment to engage the scissor bar 3 to limit the extent of relative movement of the knee members formed by the pivotal pin 11. The arrangement of the toggle is such that when overthrown it presses the knee outwardly until the knee members are in line, where they are limited in their movement by the abutment 17.

A cross bar 19 connects the scissor bars 4, one on each side of the frame, and are so positioned to engage extended portions 20 of the toggle links 12, thus providing a stop for and limiting the extent to which the toggles may be overthrown.

A cross bar 21 connects the members 12 of the two toggles whereby they may be and are operated in unison.

A lever 40 is fulcrumed on a pin 41, secured to one link 12, and has an arm 42 adapted to engage and move the cross bar 21, and another arm 43 adapted for engagement by the foot of the operator to break the toggle.

The foregoing describes the salient features of construction in the embodiment of the invention specifically illustrated in the drawing. The essential features of the invention are pointed out in the appended claims. A further discussion of the construction and of the mode of operation of the device will assist in understanding the invention and in its use.

Figure 2:
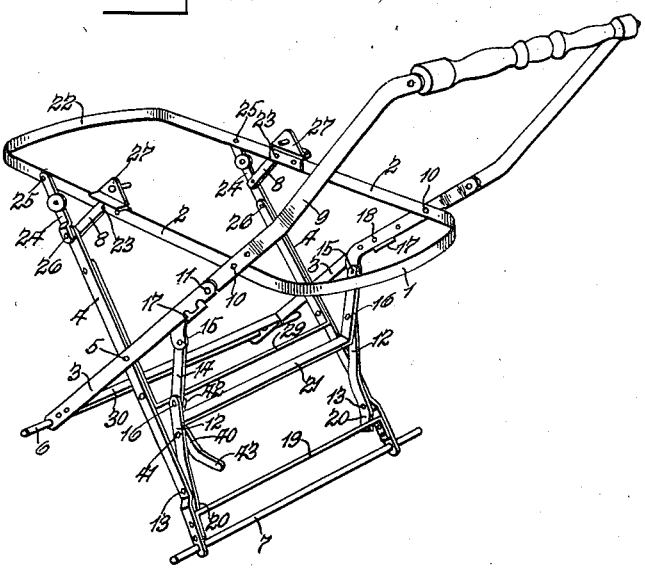
Fig. 2 is a perspective view.
Figure 3:
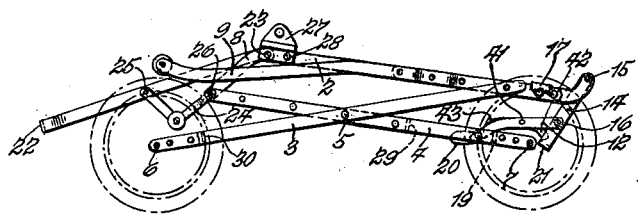
Fig. 3 is a side elevation with the frame folded.

When the frame is in extended position, as shown in Figs. 1 and 2, the toggle including the links 12 and 14 is overthrown, pressing the knee formed by the pivoted pin 11 firmly in the position in which the upper end of the scissor bar 3 contacts the abutment strip 17, thus holding the scissor bar 3 and the handle bar 9 in rigid relationship. Thereby a truss is formed comprising the bar 2, the upper end of the scissor bar 4 and the sections of the scissor bar 3 and of the handle bar 9 lying between the pivot points 5 and 10. Due to the fact that the toggle 12, 14 is held in rigid position by the stop bar 19, a second truss section is formed comprising the toggle with that part of the lower leg of the handle bar 9 lying between the pivots 15 and 11, the upper section of the scissor bar 3, and the lower section of the scissor bar 4. Thus it will be seen that the toggle is responsible for forming a double section truss as explained.

The toggle is so arranged that it forms an added support for the body to the same extent as if a rigid connection were made between the body frame member and the rear axle, that is from the pivot 15 to the pivot 13.

It will be understood, of course, that a body, not shown, is partly supported by the frame member 1, which includes the side bars 2. The front of the body is supported by a frame member 22 pivoted at each end of a bar 2 by a pin 23. The frame member 22 may be followed downwardly with respect to the frame member 1 in order to place the carriage in the condition of a "stroller". This is permitted by a toggle 24 on each side of the frame, which toggle is connected to the member 22 by a pin 25 and to the end of the extension 8 on the bar 2 by a pivot pin 26 which also serves as a pivot pin for connecting the upper end of the scissor bar 4 to the extension 8.

Canopy supporting members 27 are held by bolts or pins 23 and 28 to the bars 2 respectively. The frame is reinforced and held together by a yoke member 29 fastened to the scissor bars 4, by a cross bar 30 secured to the lower ends of the scissor bars 3 and by the cross bar 19 which has been previously described.

It is to be understood that heretofore frames have been used similar to the construction here described but without the toggles and associated cooperating devices. In such construction a small toggle similar to the toggle 24 is placed on each side of the frame from a part corresponding to the side bar 2 upwardly and backwardly to a part corresponding to the handle bar 9. In such a construction only one truss section of small proportions is provided on each side of the frame, and in actual use such a frame is easily distorted and rendered useless. As previously explained in the frame herein described a double truss is formed on each side of the frame and in addition the toggle serves as an additional support for the body.

In the prior construction referred to above the toggle folding members must be manipulated separately with the attendant danger of catching and pinching the hand of the operator. In applicant's construction pressure of the foot on the single lever 40 at once breaks the toggle on each side of the frame and collapses the structure, and in extending the frame, it is latched in position by pressure of the foot on the single cross bar 21, which overthrows the toggle.

Various changes may be made in the details of construction, within the scope of the appended claims, without departing from the spirit of this invention, and parts of the invention may be used without the whole.

I claim:

1. In a frame of the character described, a pair of pivotally connected scissor bars on each side of the frame, including a first bar supported at its bottom end by a front axle and a second supported by a rear axle, a handle bar pivoted to the upper end of the first bar forming a knee, an abutment member for limiting the extent of relative movement of the knee members in one direction, and a toggle connecting one of said knee members and the second scissor bar and positioned and arranged when overthrown to hold the knee in the position as limited by said abutment.

2. In a frame of the character described, a pair of pivotally connected scissor bars on each side of the frame, including a first bar supported at its bottom end by a front axle and a second supported by a rear axle, a handle bar pivoted to the upper end of the first bar forming a knee, an abutment member for limiting the extent of relative movement of the knee members in one direction, a toggle conencting one of said knee members and the second scissor bar and positioned and arranged when overthrown to hold the knee in the position as limited by said abutment, and an abutment member positioned to limit the extent to which said toggle may be overthrown.

3. In a frame of the character described, a pair of pivotally connected scissor bars on each side of the frame, including a first bar supported at its bottom end by a front axle and a second supported by a rear axle, a handle bar pivoted to the upper end of the first bar forming a knee, an abutment member for limiting the extent of relative movement of the knee members in one direction, a toggle on each side of the frame each comprising a pair of links connecting one of said knee members and the second scissor bar and positioned and arranged when overthrown to hold the knee in the position as limited by said abutment, and a cross bar connecting like toggle links on the two sides of the frame.

4. In a frame of the character described, a pair of pivotally connected scissor bars on each side of the frame, including a first bar supported at its bottom end by a front axle and a second supported by a rear axle, a handle bar pivoted to the upper end of the first bar forming a knee, an abutment member for limiting the extent of relative movement of the knee members in one direction, a toggle on each side of the frame each comprising a pair of links connecting one of said knee members and the second scissor bar and positioned and arranged when overthrown to hold the knee in the position as limited by said abutment, a cross bar connecting like toggle links on the two sides of the frame, and a foot lever positioned to engage and move said cross bar to break the toggle.

5. In a frame of the character described, a pair of pivotally connected scissor bars on each side of the frame, including a first bar supported at its bottom end by a front axle and a second supported by a rear axle, a handle bar pivoted to the upper end of the first bar forming a knee, an abutment member for limiting the extent of relative movement of the knee members in one direction, a toggle comprising a pair of links connecting one of said knee members and the second scissor bar and positioned and arranged when overthrown to hold the knee in the position as limited by said abutment, a cross bar connecting like toggle links on the two sides of the frame, and a foot lever fulcrumed on one of the other toggle members and positioned to engage and move said cross bar to break the toggle.

6. In a frame of the character described, a body supporting member having a bar on each side of the frame, a pair of pivotally connected scissor bars on each side of the frame, including a first bar supported at its bottom end by a front axle, a second bar supported at its bottom end by a rear axle and being pivoted at its upper end to the appropriate bar on the said body supporting member, a handle bar pivoted at an intermediate point to the rear of said appropriate bar and pivoted near its lower end to said first scissor bar forming a knee, an abutment member for limiting the extent of relative movement of the knee members in one direction, a toggle on each side of the frame each connecting one of said knee members and the second scissor bar and positioned and arranged when overthrown to hold the knee in the position as limited by said abutment, and a stop to limit the extent to which the toggle may be overthrown.

7. In a frame of the character described, a body supporting member having a bar on each side of the frame, a pair of pivotally connected scissor bars on each side of the frame, including a first bar supported at its bottom end by a front axle, a second bar supported at its bottom end by a rear axle and being pivoted at its upper end to the appropriate bar on the said body supporting member, a handle bar pivoted at an intermediate point to the rear of said appropriate bar and pivoted nearer its lower end to said first scissor bar forming a knee, an abutment member for limiting the extent of relative movement of the knee members in one direction, a toggle on each side of the frame each connecting one of said knee members and the second scissor bar and positioned and arranged when overthrown to hold the knee in the position as limited by said abutment, and a stop to limit the extent to which the toggle may be overthrown comprising a cross bar connecting the two said second scissor bars and positioned to contact a member of each of the toggles.

CARL W. BURST.